UNITED STATES PATENT OFFICE.

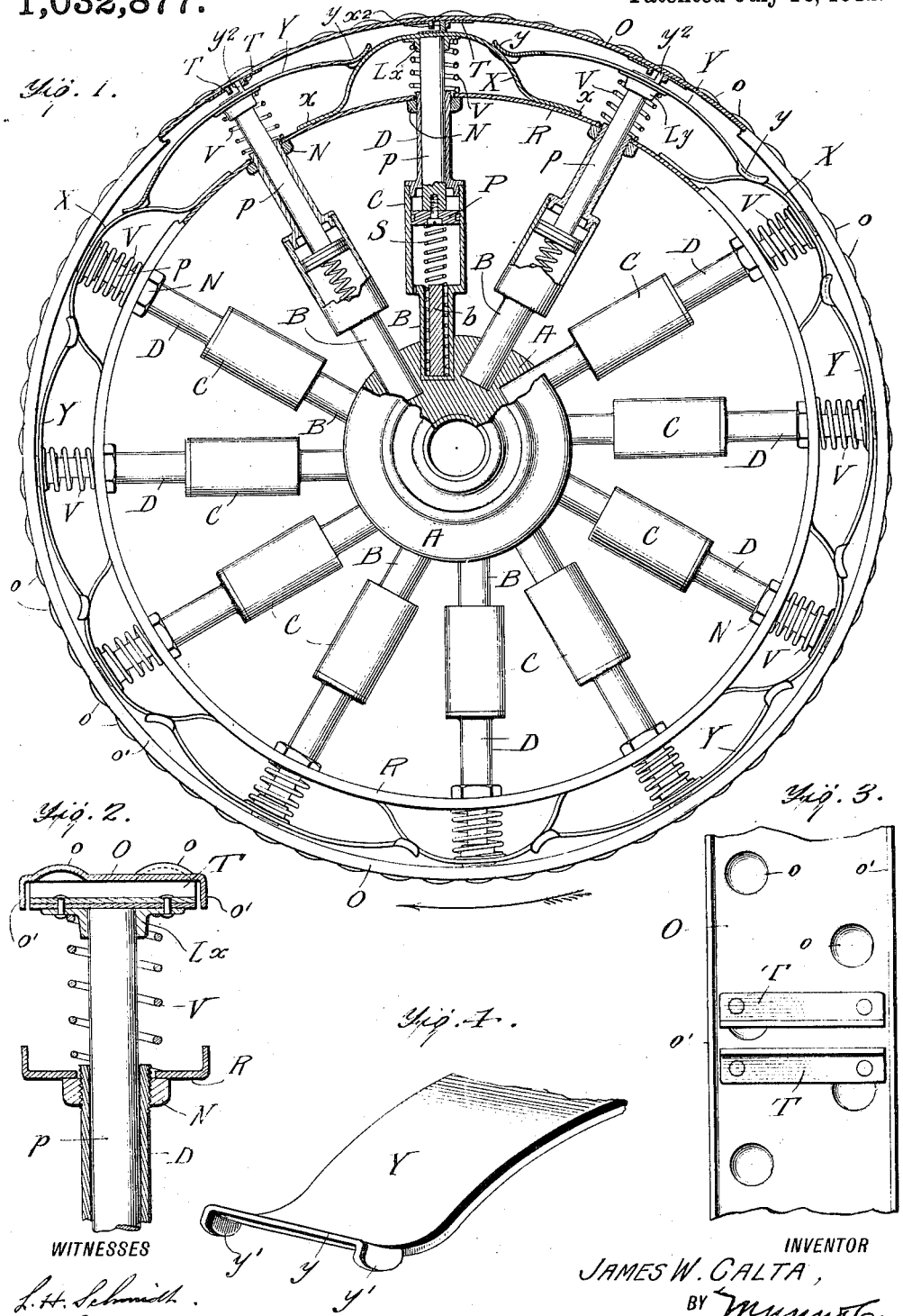

JAMES W. CALTA, OF PLATTE, SOUTH DAKOTA.

VEHICLE-WHEEL.

1,032,877.  Specification of Letters Patent.  Patented July 16, 1912.

Application filed December 29, 1911. Serial No. 668,415.

*To all whom it may concern:*

Be it known that I, JAMES W. CALTA, a citizen of the United States, and a resident of Platte, in the county of Charles Mix, in the State of South Dakota, have made certain new and useful Improvements in Vehicle-Wheels, of which the following is a specification.

My invention relates to improvements in vehicle wheels, and it consists in the combinations, constructions and arrangements herein described and claimed.

An object of my invention is to provide a device to take the place of a wheel provided with a pneumatic tire. This device has all of the advantages of the pneumatic tire, but is not as costly as the latter.

A further object of my invention is to provide a wheel having a combined spring and pneumatic action which results in a wheel having admirable riding qualities.

Other objects and advantages will appear in the following specification and the novel features of the invention will be particularly pointed out in the appended claims.

My invention is illustrated in the accompanying drawings forming part of this application in which—

Figure 1 is a side view of a wheel constructed according to my invention, certain portions thereof being shown in section. Fig. 2 is a detail sectional view showing a portion of the plunger, Fig. 3 is a detail sectional view showing the under side of a portion of the outer rim, and Fig. 4 is a detail perspective view of a portion of one of the springs.

In carrying out my invention I provide a central hub A of any suitable material such as wood or the like. The hub A is provided with a series of inwardly extending recesses into which are fitted the metallic sleeves B. As will be seen from the drawing the recesses do not extend on a radial line, but are directed toward one side of the center for a purpose hereinafter explained. The sleeves B have integral enlargements C, which constitute cylinders for a plunger P. The stem $p$ of the plunger extends through a sleeve D which is secured to the cylinder C at one end, and which passes through an inner rim R at the other, the nut N being threaded on the end of the sleeve D so as to adjust the rim R, as shown in Fig. 2. Within each sleeve B is a cylindrical rod $b$ which is disposed centrally of the sleeve B, and is surrounded by a spiral spring S, which bears at one end upon the plunger P and at the other end upon the end of the sleeve B as clearly shown in Fig. 1.

An outer rim O is provided which is concentric with the inner rim R. This outer rim O is provided with struck up portions $o$ (see Figs. 2 and 3) to prevent the wheel from slipping and to give a better grip on the ground. The outer rim is also provided with inwardly turned flanges $o'$ and has on its under side a series of L-shaped stop members T, which are secured to the rim in the manner shown in Fig. 3.

The plunger rod $p$ extends within a socket formed in the lugs $L^x$ and $L^y$ of the springs X and Y, which are disposed between the outer rim O and the inner rim R. An examination of Fig. 1 will show that the springs X are of bow-shaped form, the socket lug $L^x$ being secured on the inner central portion thereof. The ends $x$ of the springs X engage the inner rim R. A stop lug $x^2$ is provided which extends between the lugs T on the outer rim O, so as to permit a slight play of the latter, as shown in Fig. 1. Similarly the spring Y is provided with a stop lug $y^2$, which extends between the stop lugs T on the rim O. The ends of the springs Y have inwardly turned flanges $y'$ which fit over the sides of the springs X. Disposed about each plunger rod $p$ is a spiral spring, such as that shown at V, one end bearing on the lug, such as $L^x$ or $L^y$ and the other end bearing on the rim R.

From the foregoing description of the various parts of the device the operation thereof may be readily understood.

The wheel is mounted on an axle and is designed to turn in the direction shown by the arrow. As stated before the longitudinal axis of the sleeves B is not on a straight line to the center, but is to one side of the center. When the wheel is turned the spokes which comprise the sleeves B and D and the cylinder C are disposed more nearly in the line of thrust and therefore there is not the tendency for the plungers to bind as would be the case if the plunger stems were pointed directly toward the center. It will be understood that this wheel is designed primarily for rotation in a forward direction. I am aware that there would be some binding effect in the rearward rotation of the wheel, but as this occurs so seldom the advantage gained in offsetting the spokes from the radial line in the forward movement of the wheel more than compensates for the disadvantage when the wheel is turned in the opposite direction. The cylinders are filled with air and any pressure on the outer rim is resisted by the air cushion and also by the springs S within the cylinders. The member $b$ is designed to form a guide for the springs $s$ and its presence also tends to fill up the air space.

Referring now to the action of the springs X and Y it will be seen that when the pressure comes on the outer rim the ends $x$ of the spring X will slide on the inner rim R. When the pressure comes upon the spring Y the ends $y$ will slide on the curved portions of the springs X. The outer rim O will have a slight movement until the outwardly extending lugs $x^2$ and $y^2$ engage the stop lugs T. The springs V tend to take up the pressure exerted toward the center of the wheel from the exterior and act as auxiliary springs to the springs X and Y.

The wheel described above is very similar to a pneumatic tire in its operation, but, of course, is not subject to the disadvantages of the latter that arise from punctures and general wear, the parts of the device being made of wear resisting material such as metal.

The construction described is comparatively simple and the wheel is strong and durable.

I claim:—

1. In a spring wheel, a hub, a series of cylinders carried by said hub and constituting spokes of the wheel, the longitudinal axes of said cylinders being out of the radial line from the center of the hub, plungers carried by said cylinders, an inner rim secured to the ends of the cylinders, an outer rim, a series of bowed springs disposed between said inner and outer rim, the ends of certain of the plunger stems being secured to said bowed springs, and a second series of springs having their ends slidable on the first series of springs and their central portions secured to the remaining plunger stems.

2. In a spring wheel, a hub, a series of cylinders carried by said hub and constituting spokes of the wheel, the longitudinal axes of said cylinders being out of the radial line from the center of the hub, plungers carried by said cylinders, an inner rim secured to the ends of the cylinders, an outer rim, a series of bowed springs disposed between said inner and outer rim, the ends of said bowed springs being in sliding engagement with said inner rim, a second series of bowed springs, said second series of bowed springs being secured to the remaining plunger stems at the central portion of the spring, the ends of said second series of bowed springs being provided with flanges for straddling the curved portion of the springs of the first mentioned set of bowed springs on each side thereof and being in sliding engagement therewith, and an auxiliary spiral spring surrounding each plunger stem and bearing at one end on said inner rim and at the other end on the central portion of one of said bowed springs.

JAMES W. CALTA.

Witnesses:
GEORGE W. NELSON,
JOHN P. DAVIS.